Patented June 24, 1930

1,766,927

UNITED STATES PATENT OFFICE

JACQUE C. MORRELL AND GUSTAV EGLOFF, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

PROCESS OF PRODUCING RESINS

No Drawing. Application filed January 3, 1928, Serial No. 244,366. Renewed December 21, 1929.

The present invention consists in taking the polymeric hydrocarbons contained in cracked distillates, as for example, cracked petroleum distillates, and so treating them as to form resins. These resins are suitable for use in the arts and may, for example, be converted into solid-like bodies, similar to bakelite, or the like.

The invention may be carried out as follows: We may take cracked distillates and pass them, either hot or cold, or in vapor form, through a filter bed, as for example, fullers earth, which filter acts to make and/or absorb the polymers which are thus separated from the balance of the distillate. The polymeric hydrocarbons, which are present in cracked distillates are absorbed on the surface of the fine particles of the fullers earth. It is a peculiar property of some of the polymeric hydrocarbons and cracked distillates to adsorb on the surface of solids, diatomaceous earth, bentonite, or the like adsorbents. The other hydrocarbons present in the cracked distillates do not have the properties of being selectively adsorbed upon the solid surfaces, and they pass through the filter bed to be collected in storage. The adsorbed polymeric hydrocarbons are recovered by dissolving them in a diluent material, such as ether, chloroform, or the like. The solvent is then evaporated, leaving the polymeric hydrocarbons as a residue.

The polymeric hydrocarbons are then mixed with phenolic bodies, tar acids derived from wood or coal tar, or a mixture thereof. This mixture is then subjected to an oxidizing action under controlled temperature and pressure conditions to produce the resins desired. For example, we may take these polymeric hydrocarbons recovered, as heretofore stated, and heat them in a suitable vessel to a temperature of 300 degrees F. more or less, and simultaneously subjecting them to treatment with phenols, tar acids, or a mixture thereof, and in the proportions of 50% of the polymeric hydrocarbons, 25% each of phenols and tar acids, if both are used, or 50% of polymeric hydrocarbons or phenols, or tar acids.

It is to be understood that the percentages given are purely illustrative.

The just named mixtures heated to approximately 300 degrees F., as stated, are subjected to an oxidizing gas, such as air, ozone, or oxides of chlorine, which is injected in a stream through the mixture body until the desired viscosity or hardness of the resins desired has been obtained. As the process proceeds, the reacting gas will combine to some extent with the tar acids or phenols and the hydrocarbons, but the bulk of the gas will, of course, pass out of the system, together with, in some cases, some light distillates. As the treatment proceeds, the mixture will gradually become viscous and the treatment may be continued until the desired viscosity or hardness is reached. The mass is then allowed to cool which tends to further solidify it. Upon cooling the finished product should be in, more or less, plastic condition so that it can be molded under pressure, as desired.

We claim as our invention

A process of making resins which comprises subjecting a mixture of polymeric hydrocarbons and a phenolic body to an elevated temperature below that which would prevent reaction from taking place in the presence of an oxidizing gas and containing the treatment until the material has reached the desired viscosity, then allowing the finished product to cool.

JACQUE C. MORRELL.
GUSTAV EGLOFF.